(12) United States Patent
Vassaux

(10) Patent No.: US 7,819,038 B2
(45) Date of Patent: Oct. 26, 2010

(54) GEAR WITH INTEGRAL OVERCOUPLE PROTECTION

(75) Inventor: Alain Vassaux, Puteaux (FR)

(73) Assignee: Hispano Suiza, Colombes Cedex (FR)

( * ) Notice: Subject to any disclaimer, the term of this patent is extended or adjusted under 35 U.S.C. 154(b) by 377 days.

(21) Appl. No.: 11/958,951

(22) Filed: Dec. 18, 2007

(65) Prior Publication Data

US 2008/0146401 A1    Jun. 19, 2008

(30) Foreign Application Priority Data

Dec. 19, 2006    (FR) .................................. 06 55659

(51) Int. Cl.
*F16H 57/00* (2006.01)
(52) U.S. Cl. .......................................... 74/405; 74/411
(58) Field of Classification Search .................... 74/405, 74/406, 411, 412 R, 447; 464/32
See application file for complete search history.

(56) References Cited

U.S. PATENT DOCUMENTS 3,247,735 A * 4/1966 Bonnafe ...................... 74/325
4,347,715 A * 9/1982 Carman et al. ................ 464/32
5,261,750 A * 11/1993 Eckhardt et al. ............. 384/455
5,341,736 A * 8/1994 Makosch et al. ............. 101/212

FOREIGN PATENT DOCUMENTS

| DE | 29 44 843 A1 | 5/1981 |
| DE | 42 40 142 C1 | 3/1994 |
| EP | 0 476 458 A1 | 3/1992 |

OTHER PUBLICATIONS

U.S. Appl. No. 11/965,190, filed Dec. 27, 2007, Vassaux, et al.

* cited by examiner

*Primary Examiner*—Thomas R Hannon
*Assistant Examiner*—Justin Krause
(74) *Attorney, Agent, or Firm*—Oblon, Spivak, McClelland, Maier & Neustadt, L.L.P.

(57) ABSTRACT

A gear including a pinion, a shaft and a disc is disclosed. The disc includes a cleavable element arranged to disengage the pinion from the shaft in case of an overcouple between the pinion and the shaft. A guiding module of the pinion is arranged to maintain the pinion in rotation in the support in case of a disengagement of the pinion from the shaft. In a turbo-machine, a gear box including such a gear allows the driving of auxiliary machines in case of a breakdown of a shaft in the gear box.

9 Claims, 2 Drawing Sheets

GEAR WITH INTEGRAL OVERCOUPLE PROTECTION

The present invention relates to the gear field, particularly to the gears present in gearing boxes for driving auxiliary machines in a turbo-machine.

The gears are used in all branches of mechanics to transmit movements, from clocks to heavy industry reducers. A gear is composed of two toothed pinions, respectively mounted on rotatable shafts. A driving shaft rotatably drives a pinion, said pinion being integrally mounted with the shaft. The teeth of the driving pinion are engaged with the driven pinion teeth in order to transmit the rotary movement from the driving shaft to the driven shaft. When more than two toothed pinions are engaged, this is referred to as a gear train.

A gear train comprises a plurality of serial gears forming a kinematics chain. A motor shaft mounted upstream from the kinematics chain rotatably drives a pinion with which it is integrally arranged. The pinions of the gear train, placed downstream from the motor shaft in the kinematics chain, are rotatably driven step by step by the rotation of the motor shaft.

The pinions respectively situated upstream and downstream in the kinematics chain with respect to a given pinion, will be referred to as upstream and downstream pinions herein below, the upstream pinion transmitting the rotary movement to the given pinion, the downstream pinion being rotatably driven by the given pinion.

A gear train can advantageously rotatably drive a plurality of shafts from a motor shaft, each driven shaft driving respectively one machine. The invention particularly relates to a gear train present in turbojets in order to drive auxiliary machines.

In a serial mounting of the gears, if a driven shaft is stuck or immobilized, the pinion integral with the shaft cannot rotate. All the pinions of the kinematics chain are likely to be blocked. In order to let the gear train go on working in such hypothesis, it is known to provide fusible means.

There are in the prior art gears formed with two pinions mounted on shafts provided with rectangular wedges fitted with the shaft. The pinions respectively comprise rectangular notches at their internal ring corresponding to the shape of the wedges. In operation, the pinions are mounted on the shafts, the notches maintaining the wedges in order to make the pinion integral with the shaft.

If one of the shafts of the gear train is stuck, the pinion the shaft of which is immobilized, suffers from an overcouple generated by the upstream pinion. The overcouple has this effect that the wedge gives way, whereby the pinion is disengaged from its shaft. The upstream pinion rotatably drives the disengaged pinion around the shaft. The kinematics chain is maintained, but for a period that can be quite short, since the pinion tends to be out of true and to move transversally and radially, this being able to go sometimes up to the gear stop, the auxiliary machines mounted downstream being then no more supplied. The loss of couple has an incidence on the gears and particularly on the machines mounted on these gears.

One object of the invention is to allow a pinion, the shaft of which is immobilized, to transmit the rotary movement to a downstream pinion in order to maintain the transmission yield per gear.

For this purpose, the Applicant provides a gear comprising a pinion being integral with a rotatably mounted shaft in a support through a cleavable element arranged to disengage the pinion from the shaft in case of an overcouple between the pinion and the shaft, characterized by the fact that a pinion guiding module, being pending, is arranged to hold the pinion in rotation in the support in case of a disengagement of the pinion from the shaft.

Advantageously, if a shaft being integral with an auxiliary pinion from a gear train is stuck or immobilized, the pinion, being submitted to an important couple, is disengaged from the shaft by means of the cleavable element serving as a "fuse". The guiding module, so far pending, is activated. This module allows for the disengaged pinion to be guided in its rotation inside the support. Despite the breakdown, the yield at the gear level is maintained.

Preferably, the cleavable element is removably mounted between the pinion and the shaft.

More preferably, the cleavable element is formed with one disc being hooped between the pinion and the shaft, the disc comprising a plurality of radial arms.

Still more preferably, the guiding module comprises guiding rollers the rotation axis of which is oriented perpendicularly or parallel to the rotation axis of the shaft.

The rollers allow advantageously for the axial and/or transversal movements of the disengaged pinion to be forced so as to guide its rotation in the support.

Still more preferably, the pinion comprises a surface portion cooperating with the rollers.

According to another aspect of the invention, a box of auxiliary gears comprises a plurality of gears, in which at least one of the gears is a gear according to the invention.

Preferably, the gear box drives auxiliary machines in a turbo-machine.

According to another aspect of the invention, a turbo-machine comprises such a gear box.

The invention will be better understood from the following description, with reference to the accompanying drawing, in which.

Figure 3:
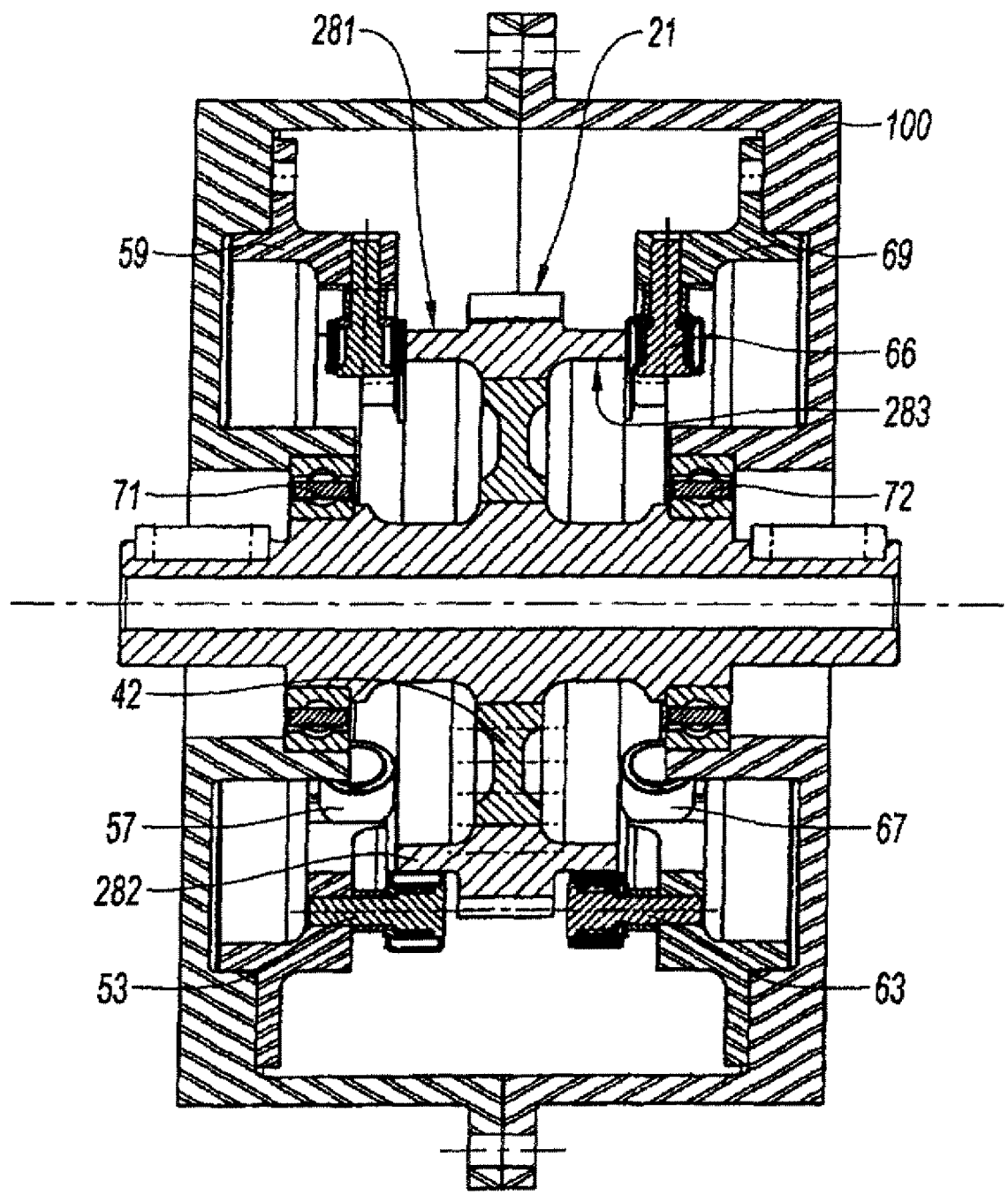
FIG. 3 represents a sectional view along the line III-III of the gear of FIG. 2 in a gear box.

Referring to FIG. 3, in a preferred embodiment of the invention, a turbojet, non shown, comprises a gear box 100. The gear box 100 serves to drive auxiliary machines mounted on shafts of a gear train supported in the box 100. Such a box 100 is generally referred to as the letter symbol AGB for "Accessory Gear Box".

Figure 1:
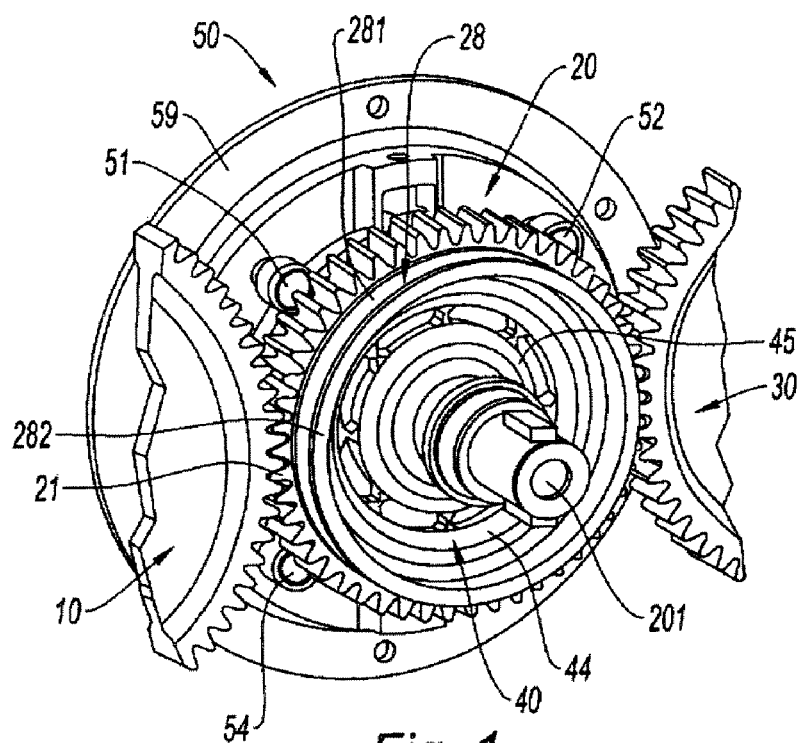
FIG. 1 represents a perspective view of the gear of the invention with only one guiding module.

Referring to FIG. 1, the gear train comprises herein three pinions 10, 20, 30 provided respectively with teeth 11, 21, 31. The pinions 10, 20, 30 are arranged in series forming a kinematics chain. A motor shaft rotatably drives the pinion 10. The rotary movement is transmitted to the pinion 20 by the teeth 11 engaged with the teeth 21, the pinions 10, 20 forming a first gear, the pinions 20, 30 forming a second gear.

The pinion 20 is integrally mounted on a rotatable shaft 201. So, when the pinion 20 is rotatably driven by the upstream pinion 10, it drives the shaft 201 by itself.

The shaft 201 is supported by bearings 71, 72, disposed respectively on each side of the pinion 20, to guide the rotation of the shaft 201 in the box 100. The bearings 71, 72 are shown herein as roller bearings.

The pinion 20 comprises a cylindrical ring 28 having an external surface 281, an inner surface 283 and two end transversal surfaces 282. The external surface 281 is comprised of three strips, a central strip and two side strips. The teeth 21 are disposed on the central strip, both side strips being tooth-free.

A disc 40 is mounted between the shaft 201 and the ring 28 and makes the shaft 201 integral with the pinion 20, the disc being advantageously mounted by hooping. The disc 40 comprises two concentric rings 44, 45, the external ring 44 being linked to the inner ring 45 by radial arms 42.

The external surface of the ring 44 of the disc 40 abuts against the inner surface 283 of the ring 28, the inner surface of the ring 45 being integral with the shaft 201.

The arms 42 of the disc 40 are formed in such a way that they have a "cleavable" portion 422 arranged to give in for a couple value, between the shaft 201 and the pinion 20, superior to a determined threshold value.

Referring to FIG. 1, a guiding module 50 is arranged for guiding the pinion 20 in its rotary movement inside the box 100 when it is no more integral with the shaft. The module 50 is arranged, being pending, parallel to the pinion 20.

The guiding module 50 comprises a cylindrical part 59 forming a support for guiding rollers 51-58, the rollers being divided into two sets of four guiding rollers 51-54, 55-58 disposed respectively on each transversal face of the part 59.

The four rollers 51-54 are disposed on each transversal face of the nearest pinion, the rotation axes of the rollers 51-54 being oriented parallel to the shaft axis 201. The rollers 51-54 comprise a track on which the external surface 281 of the ring 28 is guided when the disc 40 is no more integral with the shaft 201.

The four rollers 55-58 are disposed on the transversal face opposite to the rollers 51-54, the rotation axes of the rollers 55-58 being oriented perpendicular to the axis of the shaft 201. The rollers 55-58 comprise a track on which the side surface 282 of the ring 28 is guided when the disc 40 is no more integral with the shaft.

Figure 2:
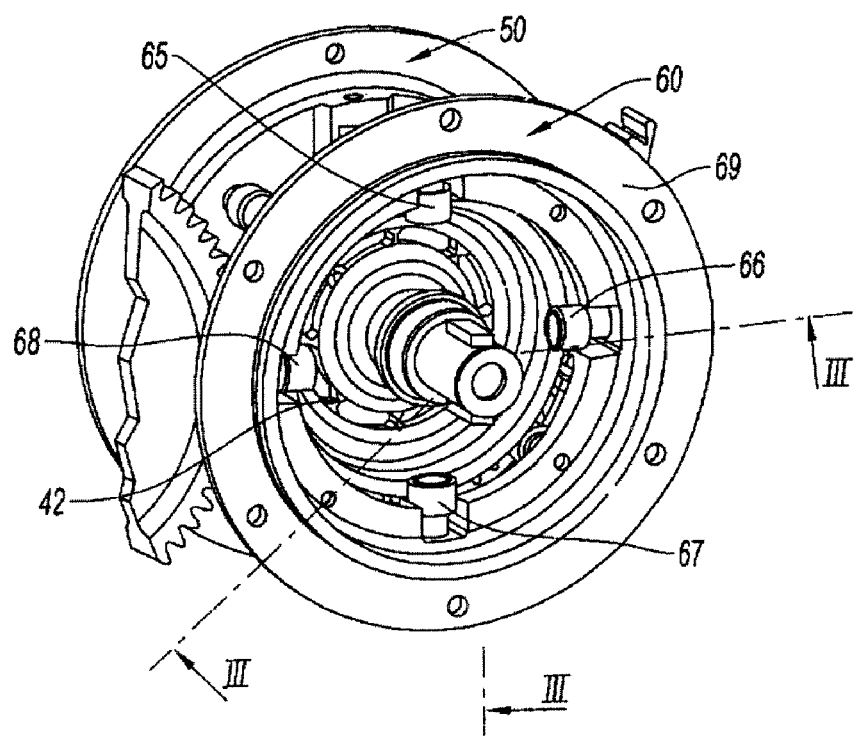
FIG. 2 represents a perspective view of the gear of FIG. 1 with two guiding modules.

Referring to FIG. 2, the box comprises a second guiding module 60 arranged to guide the pinion 20 in its rotary movement when it is disengaged. The module 60 is disposed, being pending, parallel to the pinion 20 inside the box 100.

The guiding module 60 comprises a cylindrical part 69 forming a support for guiding rollers 61-68, the rollers being divided into two sets of four guiding rollers 61-64, 65-68 disposed respectively on each transversal face of the part 69.

The four rollers 61-64 are disposed on each transversal face of the nearest pinion, the rotation axes of the rollers 61-64 being oriented parallel to the shaft axis 201. The rollers 61-54 comprise a track on which the external surface 283 of the ring 28 is guided when the disc 40 is no more integral with the shaft 201.

The four rollers 65-68 are disposed on the transversal face opposite to the rollers 61-64, the rotation axes of the rollers 65-68 being oriented perpendicular to the axis of the shaft 201. The rollers 65-58 comprise a track on which the side surface 282 of the ring 28 is guided when the disc 40 is no more integral with the shaft 201.

Upon a normal operation of the gear train, the upstream pinion 10 rotatably drives the pinion 20, the couple received being lower than the threshold value. The rotary movement is transmitted to the downstream pinion 30 by the pinion 20. The guiding modules 50, 60 are pending, that is inactive, and stay at distance from the pinion 20.

If the shaft 201 is stuck, the rotary movement is disturbed. An overcouple, exceeding the threshold value, is created between the pinion 20 and the shaft 201 and makes the arms 42 give in. The "fusible" portion 422 of each arm 42 gives in to disengage the pinion 20 from the shaft 201, the pinion 20 being rotatably driven and the stuck shaft 201 remaining stationary.

After disengagement of the pinion 20, this one is not free to move axially and transversally. If the pinion 20 is driven by the upstream pinion 10 transversally, the external surface 281 of the ring 28 contacts at least one of the guiding rollers with a parallel axis 51-54, 61-64. The transversal movements of the pinion 20 are forced and the rotation of the pinion 20 with respect to the shaft 201 is guided inside the box 100.

If the pinion 20 is driven by the upstream pinion 10 longitudinally, the side surfaces of the ring 28 contact at least one of the guiding rollers with a perpendicular axis 55-58, 65-68. The axial movements of the pinion 20 are forced and the rotation of the pinion 20 with respect to the shaft 201 is guided.

Both guiding modules 50, 60 allow the axial and transversal movements of the pinion 20 to be forced and only the rotation of the pinion 20 around the shaft 201 to be authorized. Thus, the disengaged pinion does not contact the box 100 and is guided inside it. Despite the breakdown of the shaft 201, the yield of the gear is optimized and the kinematics chain is preserved.

Referring to FIG. 3, the guiding modules 50, 60 comprise as many rollers with perpendicular axes as rollers with parallel axes. However, the number of rollers having radial axes can be increased compared to the number of rollers having parallel axes, or inversely, as a function of the desired guiding.

A single guiding module 50 can be sufficient to guide the pinion 20, however when two guiding modules 50, 60 are associated on each side of the pinion 20, the guiding is optimized.

The disc 40, placed between the pinion 20 and the shaft 201, is easily removable after breaking. Its exchange is fast, simple and cheap. When a shaft 201 is stuck, the energy provided by the overcouple is absorbed by the disc 40 and it is not necessary to replace the expensive parts such as the shaft 201 and the pinion 20.

At the turbo-machine level, the invention allows for the gear box to drive the auxiliary machines despite the breakdown of a shaft of the gear train.

The invention claimed is:

1. A gear comprising:
a pinion including a cylindrical ring with an external surface and an inner surface;
a shaft which is rotatably mounted in a support; and
a disc which is mounted between the pinion and the shaft such that the pinion and the shaft are integral, the disc including an external ring, an internal ring and a plurality of cleavable radial arms disposed between the external ring and the internal ring,
wherein an outer surface of the external ring of the disc abuts the inner surface of the cylindrical ring of the pinion and an inner surface of the inner ring of the disc is integral with the shaft,
wherein the cleavable radial arms are arranged to disengage the pinion from the shaft in case of an overcouple between the pinion and the shaft, and
wherein a guiding module of the pinion is arranged to rotatably maintain the pinion inside the support in case of a disengagement of the pinion from the shaft.

2. The gear according to claim 1, wherein the plurality of cleavable radial arms is removably mounted between the pinion and the shaft.

3. The gear according to claim 1, wherein the guiding module comprises guiding rollers, the rotation axis of the guiding rollers is oriented perpendicular or parallel to the rotation axis of the shaft.

4. The gear according to claim 3, wherein a portion of the pinion surface cooperates with the rollers.

5. A gear box comprising a plurality of gears, wherein at least one gear is the gear according to claim 1.

6. The gear box according to claim 5, wherein the gear box drives auxiliary machines in a turbo-machine.

7. A turbo-machine comprising a gear box which drives auxiliary machines according to claim 6.

8. The gear according to claim 1, wherein a width of the cleavable radial arm is less than a width of the external ring and a width of the internal ring in a direction parallel to an axis of the shaft.

9. The gear according to claim 1, wherein the external surface of the cylindrical ring includes a central strip and two side strips, teeth of the pinion are disposed on the central strip and the two side strips are free of teeth.

* * * * *